US011958522B2

(12) United States Patent
Zutler et al.

(10) Patent No.: US 11,958,522 B2
(45) Date of Patent: *Apr. 16, 2024

(54) STIFFENED NESTING SHOPPING CART (71) Applicant: GLOBAL INDUSTRIAL DISTRIBUTION INC., Port Washington, NY (US)

(72) Inventors: Bruce Zutler, Port Washington, NY (US); Kevin Chow, Port Washington, NY (US); Harry Wellington, Port Washington, NY (US)

(73) Assignee: GLOBAL INDUSTRIAL DISTRIBUTION INC., Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,232

(22) Filed: Nov. 2, 2022

(65) Prior Publication Data
US 2023/0057950 A1 Feb. 23, 2023

Related U.S. Application Data (63) Continuation of application No. 17/209,886, filed on Mar. 23, 2021, now Pat. No. 11,548,544.

(51) Int. Cl.
*B62B 3/18* (2006.01)
(52) U.S. Cl.
CPC ..................... *B62B 3/18* (2013.01)
(58) Field of Classification Search
CPC ......... B62B 3/18; B62B 3/1496; B62B 3/182; B62B 3/008; B62B 3/02; B62B 3/14; B62B 3/1464; B62B 3/1468; B62B 2202/00; B62B 2202/22; B62B 2205/30
See application file for complete search history.

(56) References Cited

U.S. PATENT DOCUMENTS

| 1,480,851 A | 1/1924 | Baum | |
|---|---|---|---|
| 2,590,048 A * | 3/1952 | Sides | B62B 3/182 |
| | | | 280/33.996 |
| 2,590,285 A | 3/1952 | Wiltshire | |

(Continued)

FOREIGN PATENT DOCUMENTS

| CA | 2153836 A1 * | 1/1997 |
|---|---|---|
| CA | 2153836 A1 | 1/1997 |

(Continued)

OTHER PUBLICATIONS

Office Action issued in counterpart U.S. Appl. No. 17/980,233, dated Oct. 2, 2023.

*Primary Examiner* — James A Shriver, II
*Assistant Examiner* — Michael T. Walsh
(74) *Attorney, Agent, or Firm* — TROUTMAN PEPPER HAMILTON SANDERS LLP (57) ABSTRACT

A nestable shopping cart includes an upright frame, an upper angle support and a pair of tie bars extending out from the upright frame. A tray is pivotally connected to the upright frame. The tray includes a utility position and a nested position. The tray includes a tapered front and at least one side. A slope plate is mounted to at least one side of the tray. In the nested position, the nestable shopping cart is nested with another nestable shopping cart, resulting in a nesting gap of about 11 inches between the shopping carts.

20 Claims, 7 Drawing Sheets

(56) References Cited

U.S. PATENT DOCUMENTS

| | | | | |
|---|---|---|---|---|
| 2,596,775 | A | * | 5/1952 | Kasper ................ B62B 3/14 280/33.996 |
| 2,644,695 | A | * | 7/1953 | Enders ................ B62B 3/14 280/33.996 |
| 2,738,201 | A | * | 3/1956 | Spears ................ B62B 3/1476 280/33.996 |
| 3,245,498 | A | * | 4/1966 | Stanley ................ B62B 3/148 186/63 |
| 4,268,049 | A | | 5/1981 | Salvador |
| 4,850,604 | A | * | 7/1989 | Le Marchand ........ B62B 3/182 280/33.996 |
| 5,306,033 | A | * | 4/1994 | Evans ................ B62B 3/142 D34/27 |
| 5,324,055 | A | * | 6/1994 | Trubiano ............ B62B 3/144 D34/27 |
| 5,548,911 | A | * | 8/1996 | Myers ................ G09F 23/06 224/277 |
| 5,787,547 | A | | 8/1998 | Joseph et al. |
| 5,836,596 | A | | 11/1998 | Wanzl |
| 6,003,894 | A | * | 12/1999 | Maher ................ B62B 3/14 280/639 |
| 6,886,216 | B2 | | 5/2005 | Graham et al. |
| 8,181,310 | B2 | | 5/2012 | Schulte |
| 9,085,314 | B2 | * | 7/2015 | Selvig ................ B62B 3/182 |
| 9,523,381 | B1 | | 12/2016 | Carpinella et al. |
| 11,548,544 | B2 | * | 1/2023 | Zutler ................ B62B 3/1496 |
| 2009/0309322 | A1 | * | 12/2009 | Selvig ................ B62B 3/1476 280/33.996 |
| 2013/0091664 | A1 | | 4/2013 | Breyer |
| 2013/0207362 | A1 | * | 8/2013 | Smith ................ B62B 3/14 280/47.34 |
| 2015/0053688 | A1 | * | 2/2015 | Peters ................ B62B 3/14 220/492 |
| 2016/0107667 | A1 | * | 4/2016 | Eberlein ............ B62B 3/1476 280/33.996 |
| 2016/0257329 | A1 | * | 9/2016 | Sherman ............ B62B 3/1468 |
| 2017/0080966 | A1 | * | 3/2017 | McMurtrey ........ B62B 3/1444 |
| 2021/0039700 | A1 | * | 2/2021 | Gardner ............ B62B 3/1484 |
| 2021/0070341 | A1 | | 3/2021 | Eberlein |
| 2022/0107639 | A1 | | 4/2022 | Maniwa et al. |

FOREIGN PATENT DOCUMENTS

| | | | | |
|---|---|---|---|---|
| CN | 109131514 | A | | 1/2019 |
| EP | 2222529 | B1 | * | 8/2011 ........ B62B 5/0006 |
| EP | 2222529 | B1 | | 8/2011 |
| EP | 2390160 | A2 | | 11/2011 |
| FR | 2707232 | A1 | | 1/1995 |
| FR | 2925449 | A1 | * | 6/2009 ........ B62B 5/0006 |
| FR | 2925449 | A1 | | 6/2009 |
| GB | 809393 | A | | 8/1957 |
| GB | 1042503 | A | | 9/1966 |
| GB | 1422365 | A | | 1/1976 |
| JP | 2022060051 | A | | 4/2022 |
| SE | 512163 | C2 | * | 2/2000 ........ B62B 3/14 |
| SE | 512163 | C2 | | 7/2000 |
| WO | WO-9014260 | A | * | 11/1990 ........ B62B 3/027 |
| WO | 9422705 | A1 | | 10/1994 |
| WO | WO-9422705 | A1 | * | 10/1994 ........ B62B 3/1408 |

* cited by examiner

STIFFENED NESTING SHOPPING CART

CROSS-REFERENCE TO RELATED APPLICATIONS

This application is a continuation of, and claims priority under 37 C.F.R. § 120 to, U.S. patent application Ser. No. 17/209,886, filed Mar. 23, 2021, the entire contents of which are fully incorporated herein by reference.

FIELD

The present invention relates to a nestable shopping cart with enhanced stiffness.

BACKGROUND

Existing shopping carts do not have a compact storage configuration, and typically require a lot of labor work to collect and move them. Trays and/or baskets of existing shopping carts require improvements on durability.

A need exists for an improved nestable shopping cart configuration to facilitate collecting and moving many carts at one time. A need also exists for an improved tray for added durability. Embodiments of the present disclosure are directed to this and other considerations.

SUMMARY

Aspects of the disclosed technology include a nestable shopping cart, having an upright frame, an upper angle support and a pair of tie bars extending out from the upright frame. A tray is pivotally connected to the upright frame. The tray includes a utility position and a nested position. The tray includes a tapered front and at least one side. A slope plate is mounted to at least one side of the tray. In the nested position, the nestable shopping cart is nested with another nestable shopping cart, resulting in a nesting gap of about 11 inches between the shopping carts.

Further features of the present disclosure, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1A:
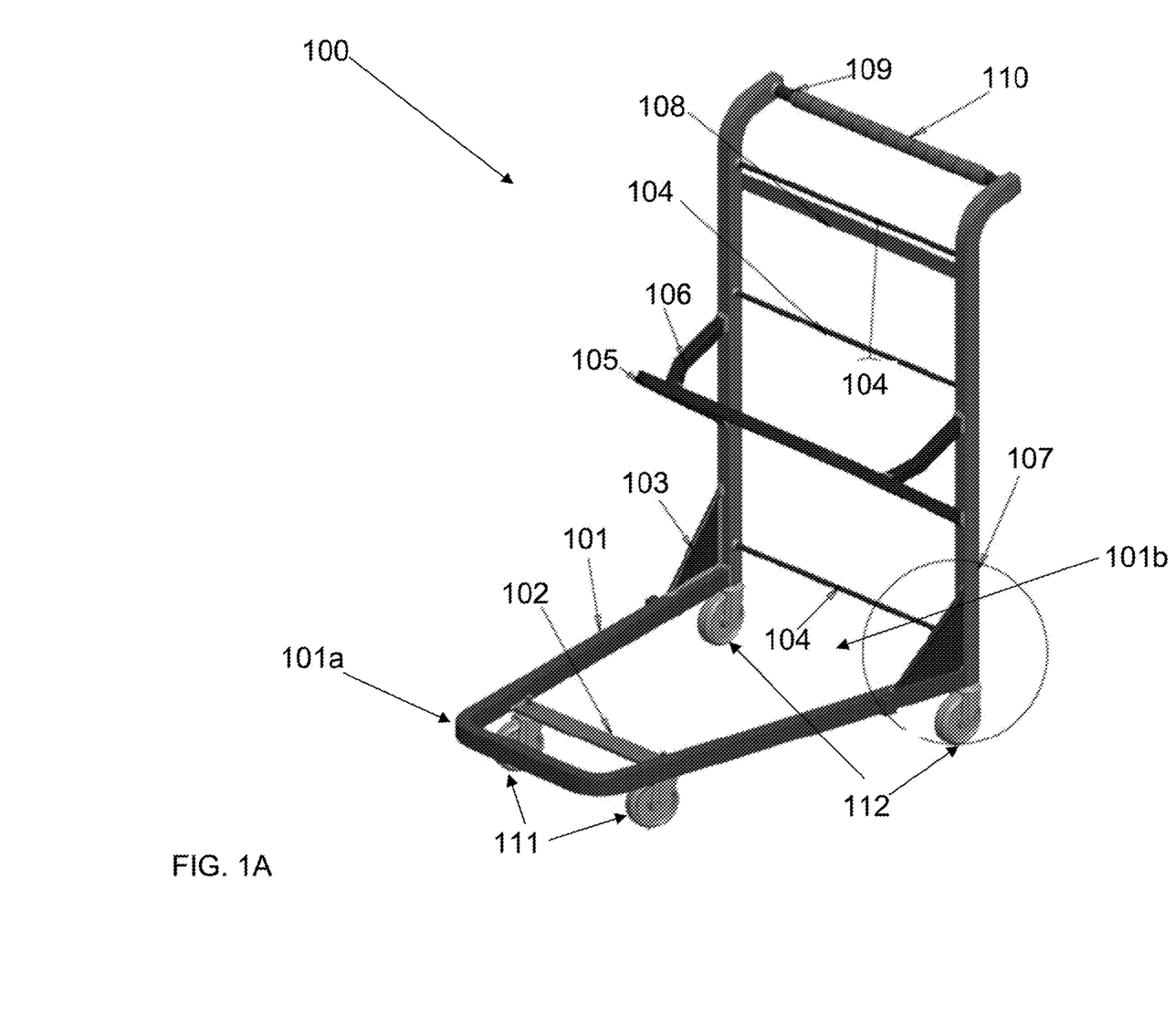
FIG. 1A is a diagram of a nestable shopping cart according to one aspect of the present disclosure.
Figure 4A:
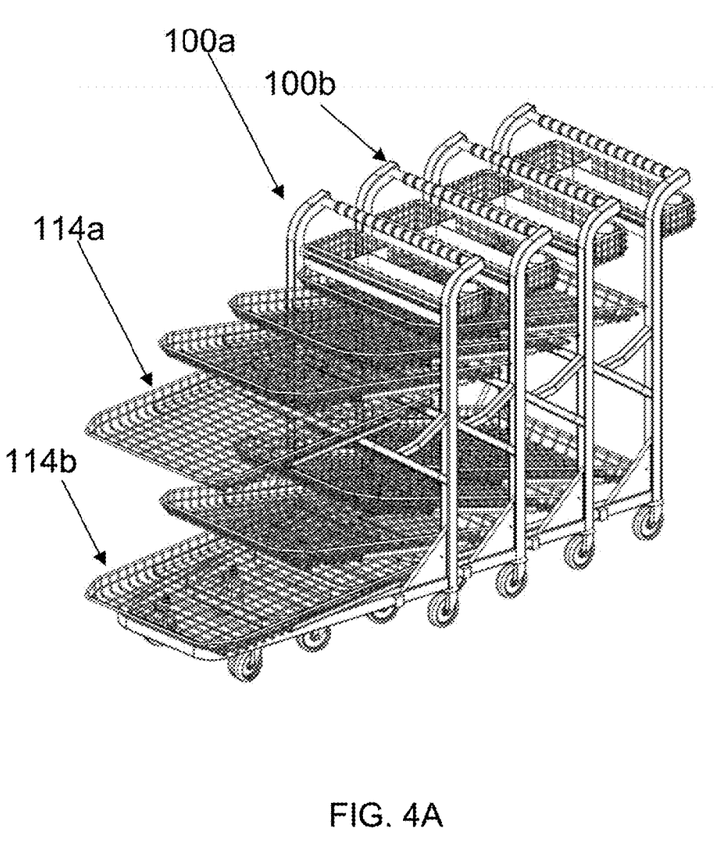
FIGS. 4A-4C illustrate a plurality of nestable shopping carts in a nesting position according to one aspect of the present disclosure.
Figure 4B:
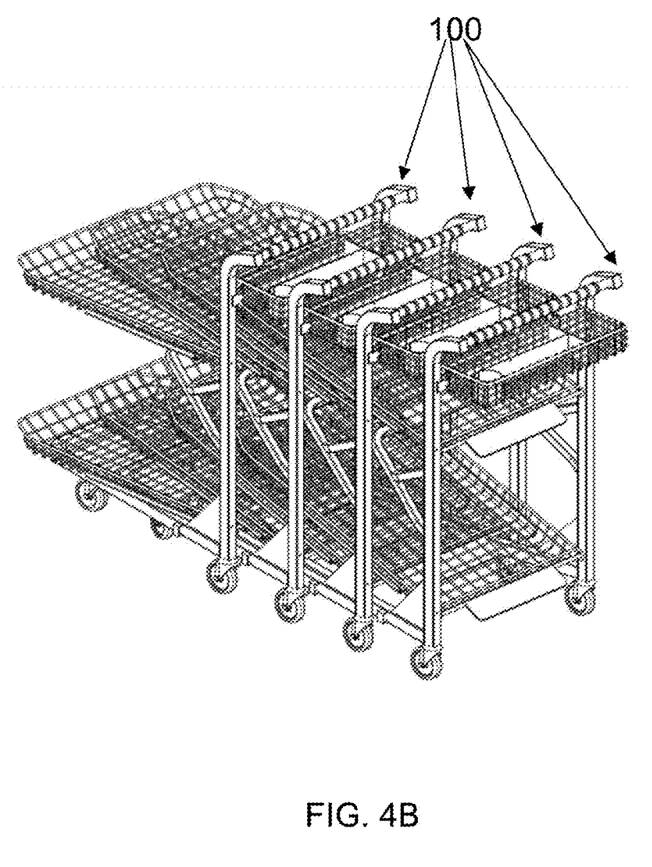
Figure 4C:
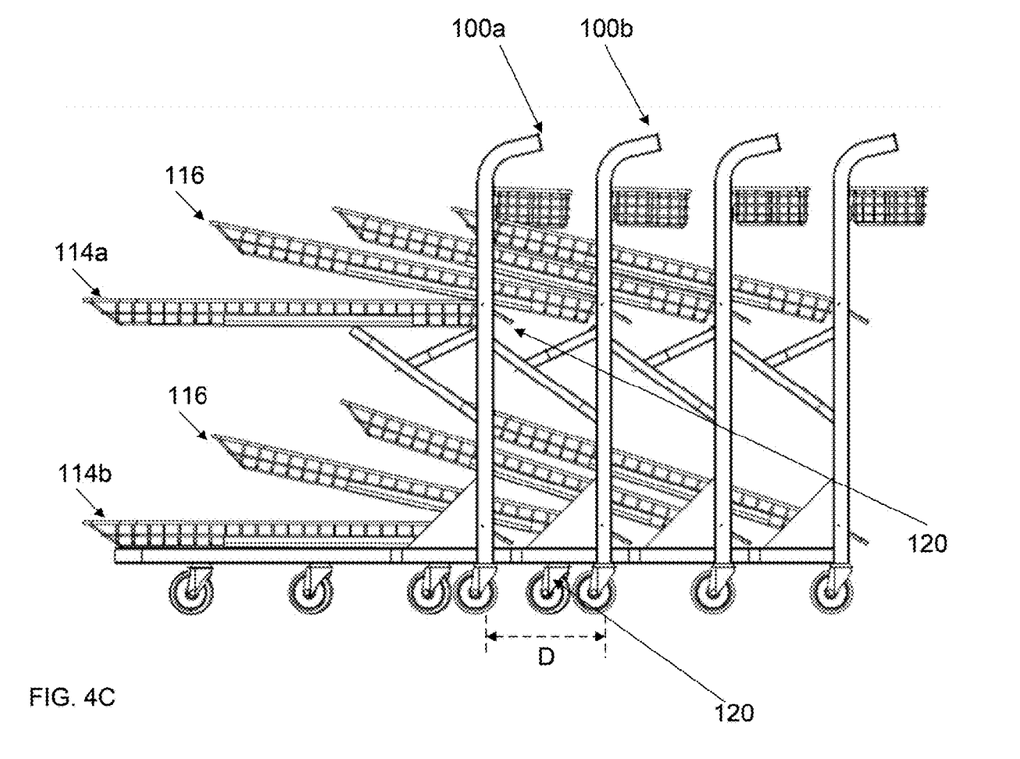

Referring to FIG. 1A, a nestable shopping cart 100 may have a bottom frame 101, a crossbar 102 mounted on the bottom frame 101, a pair of angle supports 103, three support rods 104, an upper angle support 105, a pair of tie bars 106, a pair of upright frames 107, a brace 108, a handlebar 109, a handle grip 110, and four swivel casters 111. The bottom frame 101 is "U" shaped in the plane parallel with the floor. The bottom frame has a tapered front 101a and an opening 101b faces toward the rear, or handlebar 109 side of the cart 100. The upper angle support 105 may extend out from the upright frame 107. With reference to the upper angle support 105 and the pair of tie bars 106, the adjacent side of the right angle may extend out just enough to support evenly distributed weight, and allow a tight nesting gap D as illustrated in FIG. 4C.

In one embodiment, the four swivel casters 111 may allow 360 degrees directional motion. In another embodiment, the front pair of casters 111 may be swivel casters, whereas the back pair of casters 112 may be rigid casters. In one embodiment, the front pair of casters 111 may be set back about 7 inches from the edge of the crossbar 102.

Figure 1B:
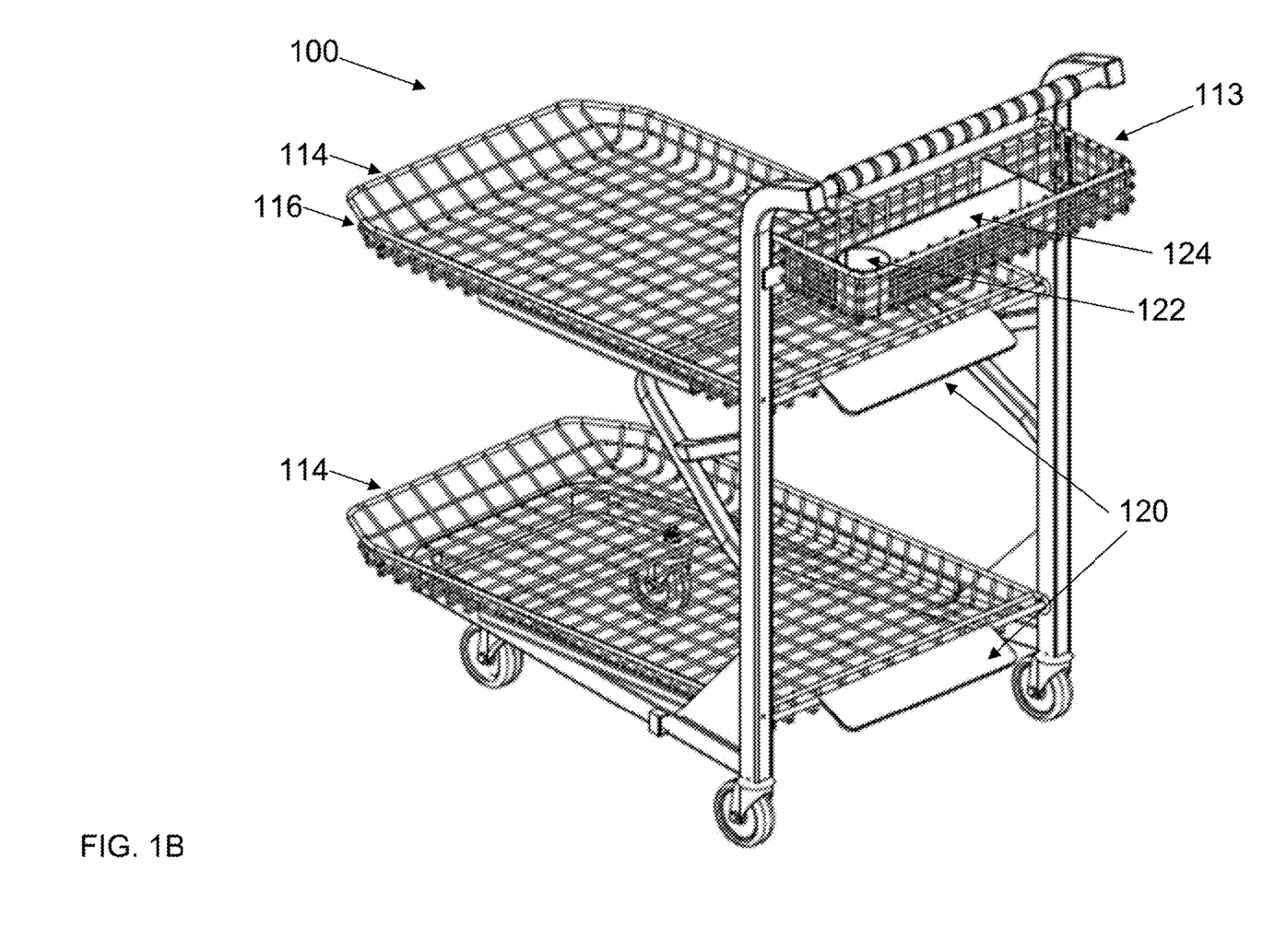
FIG. 1B illustrates a diagram of the shopping cart of FIG. 1A with trays and an upper basket mounted thereon according to one aspect of the present disclosure.

Referring to FIG. 1B, the cart 100 may have an upper basket 113 and a pair of trays or shelf baskets 114. One tray 114 may be supported by the upper angle support 105 and the tie bars 106. Another tray 114 may be supported by the bottom frame 101.

As shown in FIG. 1B, a welded slope plate 120 may be mounted to the side of each tray 114 for added durability. The upper basket 113 may include a cup holder 122 and at least one storage divider 124.

Figure 2:
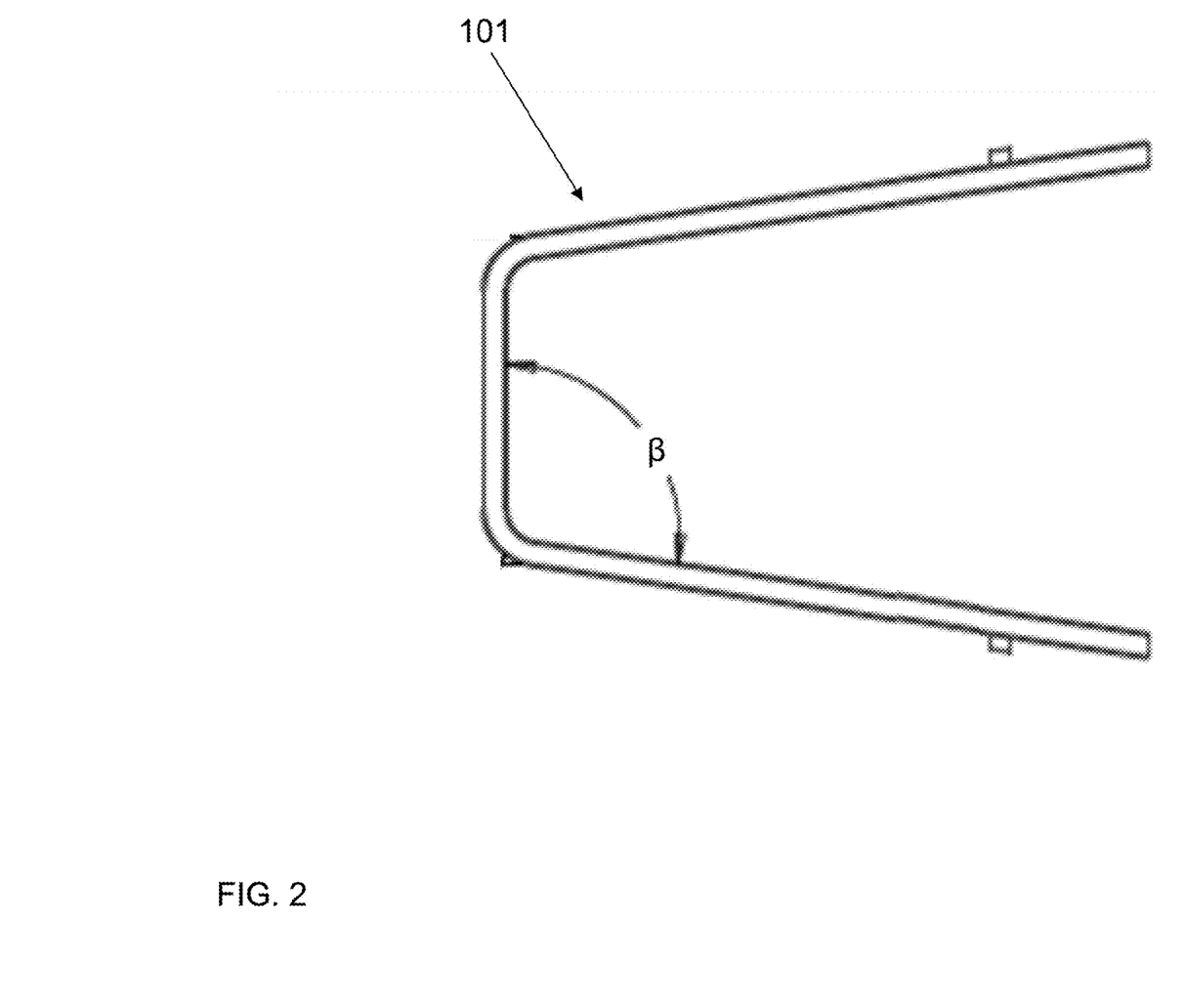
FIG. 2 illustrates a planar view of a bottom frame according to one aspect of the present disclosure.

As illustrated in FIG. 2, the bottom frame 101 may form an angle β. The angle β may be about 98.5 degrees. In another embodiment, the angle β may be about 98.5+/−0.5 degrees. The bottom frame 101 has an angle β greater than 90° to facilitate an "open" tapered shape.

Figure 3:
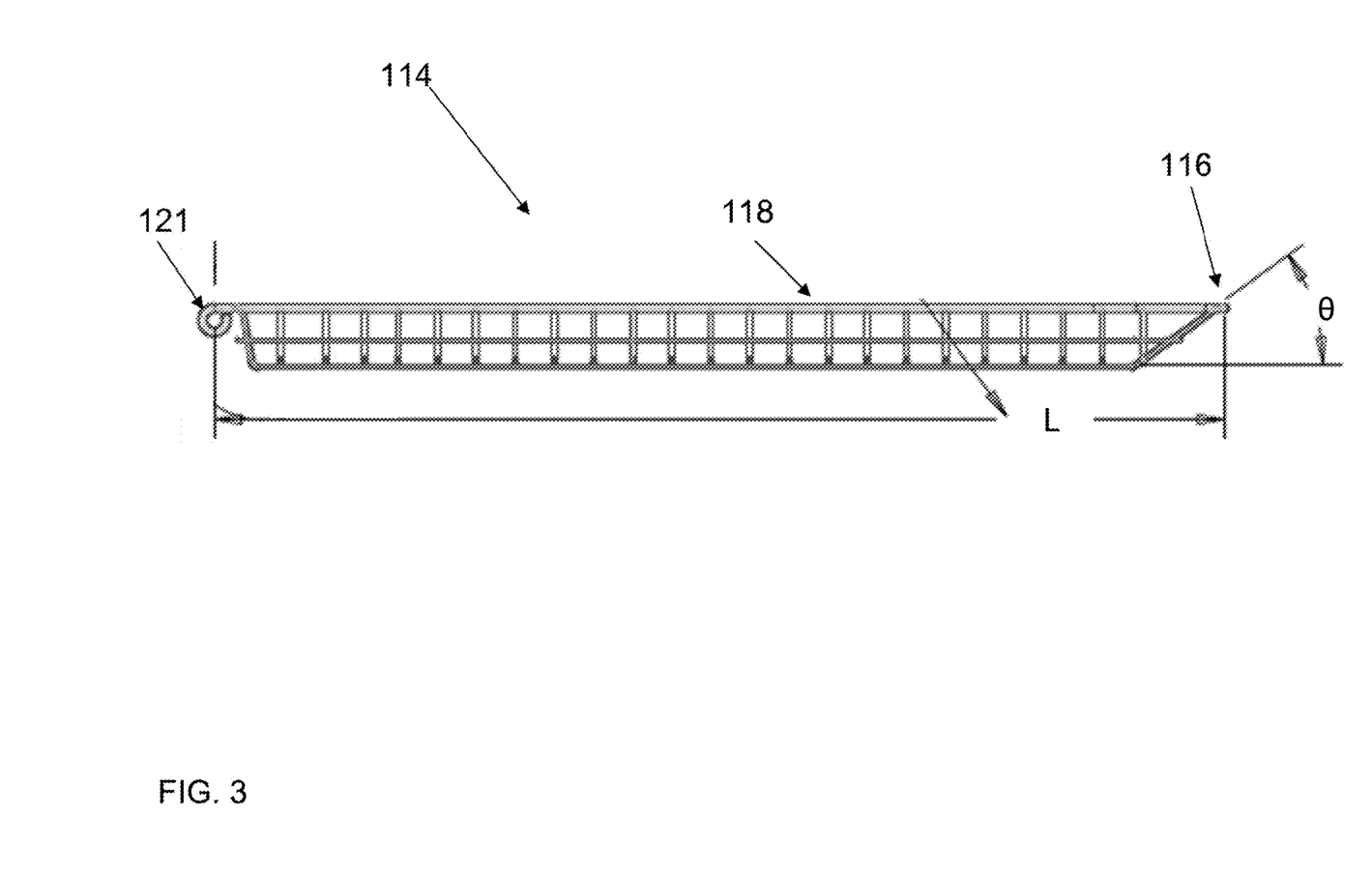
FIG. 3 illustrates a side view of a tray according to one aspect of the present disclosure.

Each tray 114 may be a stiffener plate. As illustrated in FIG. 3, each tray 114 may have a length L about 38 inches, such as 37.88 inches. Each tray 114 may exhibit a grid steel wire pattern. Each tray 114 may have a perimeter wire 118 for added structural support. The perimeter wire 118 may have a diameter of about 5/16 inches. Each tray 114 may have a tapered front 116 forming an angle θ. In one embodiment, the angle θ may be about 35 degrees. The tapered tray 114 and the welded slope plates 120 may ease nesting as illustrated in FIGS. 4A-4C. The tray 114 also includes pivot point 121. The pivot point 121 can be formed from the steel grid wire or welded on as a separate piece.

FIGS. 4A-4C illustrate a plurality of nestable shopping carts 100 in a nesting position. Each cart 100 may nest within each other in a line to facilitate collecting and moving many carts at one time. When they are nested, each pair of adjacent carts may be distanced from each other by a nesting gap D. The nesting gap D may be about 11 inches.

Turning now to assembly and use, as illustrated above, each of the trays 114 are pivotally attached to the upright frames 107 through the pivot point 121. The attachment can be individual through each hole, or a single axle can run between the two upright frames 107 and through the pivot point hole 121. Once pivoted, the top tray 114a rests on the upper angle support 105. The bottom tray 114b, attached through the pivot point 121 as above, rests on the bottom frame 101.

During use, the trays 114 are at rest and generally parallel to each other. The upper tray 114a is spaced to allow larger items to be placed without interference from the top tray 114a. Here, the trays 114 are considered to be in a utility position to allow for the loading and transport of goods in the cart 100.

During stacking, a second cart 100b is directed into the back of a first cart 100a. The tapered front 101a of the second cart 100b fits through the opening 101b of the first cart 100a to begin the nesting process. At the same time, the tapered front 116 of the trays 114 of the second cart 100b engage with the slope plates 120 of the first cart 100a. This causes the trays 114 of the second cart 100b to pivot upwards allowing the more of the second cart's 100b bottom frame 101 to nest inside the bottom frame 101 of the first cart 100a. This is clearly illustrated in FIG. 4C and allows for a small nesting gap D. This is the nested position. Note that in one example, the trays 114 pivot individually and in other examples only one can pivot, or the trays can be linked to pivot in unison.

Figure 5:
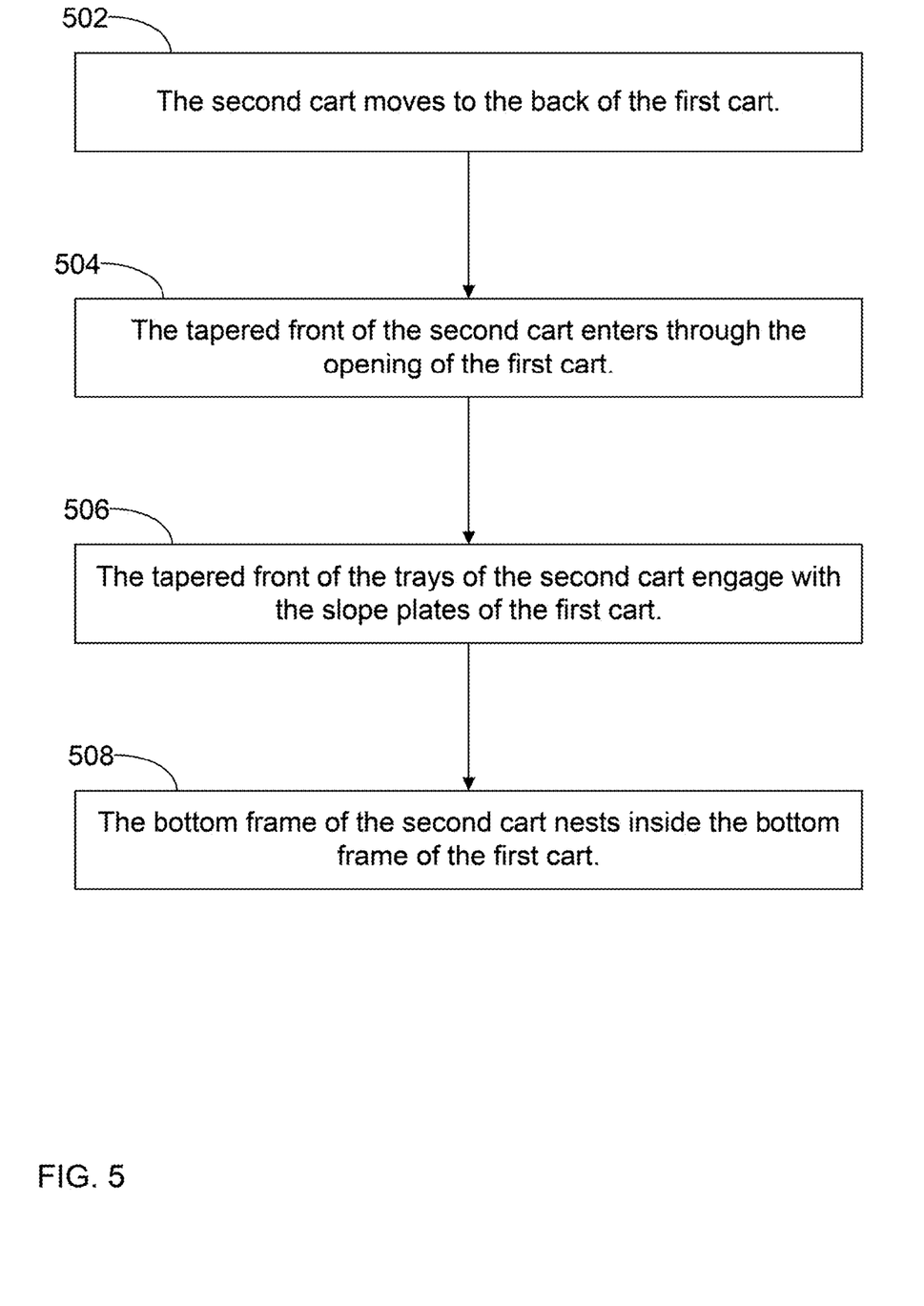
FIG. 5 is flow chart diagram of a method of use of the present invention.

FIG. 5 is a flow chart illustrating a process of nesting shopping carts. At 502, the second cart 100b moves to the back of the first cart 100a. At 504, the tapered front 101a of the second cart 100b enters through the opening 101b of the first cart 100a. At 506, which may happen at the same time as the step 504, the tapered front 116 of the trays 114 of the second cart 100b engage with the slope plates 120 of the first cart 100a, pivoting the trays 114 of the second cart 100b upwards. At 508, the bottom frame 101 of the second cart 100b nests inside the bottom frame 101 of the first cart 100a.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A nestable cart, comprising:
an upright frame;
a tray pivotally connected to the upright frame and comprising a utility position and a nested position, the tray comprising at least one side; and
a slope plate directly mounted to the at least one side of the tray,
wherein in the nested position, the nestable cart is nested with another nestable cart, resulting in a consistent gap between the carts.

2. The nestable cart of claim 1, further comprising:
a bottom frame; and
a second tray supported by the bottom frame.

3. The nestable cart of claim 2, wherein the second tray is pivotally connected to the upright frame and comprises a second utility position and a second nested position.

4. The nestable cart of claim 2, wherein the tray and the second tray are identical.

5. The nestable cart of claim 2, wherein the bottom frame may form an angle of about 98.5 degrees.

6. The nestable cart of claim 1, wherein the slope plate is configured to be welded to the tray.

7. The nestable cart of claim 1, wherein the nestable cart is configured to be nested within the another nestable cart in a line.

8. The nestable cart of claim 1, further comprising four swivel casters for 360 degrees directional motion.

9. The nestable cart of claim 1, further comprising a pair of front casters.

10. The nestable cart of claim 9, wherein the front casters are set back about 7 inches from a crossbar mounted on a bottom frame.

11. The nestable cart of claim 1, wherein the tray exhibits a grid steel wire pattern.

12. The nestable cart of claim 1, wherein the tray includes a perimeter wire.

13. The nestable cart of claim 12, wherein the diameter of the perimeter wire is about 5/16 inch.

14. The nestable cart of claim 1, further comprising an upper basket.

15. The nestable cart of claim 14, wherein the upper basket may include a cup holder and at least one storage divider.

16. The nestable cart of claim 1, further comprising a tapered front, wherein the tapered front forms an angle of about 35 degrees.

17. The nestable cart of claim 16, wherein the at least one side of the tray is disposed opposite the tapered front.

18. The nestable cart of claim 1, further comprising:
an upper angle support; and
a pair of tie bars extending out from the upright frame.

19. The nestable cart of claim 18, wherein:
the tray further comprises a bottom surface,
the upright frame extends upward beyond the tray, and the upper angle support extends out from the upright frame and is configured to engage with the bottom surface of the tray.

20. The nestable cart of claim 19, wherein the tray is configured to rest on the upper angle support.

* * * * *